Figure 1:
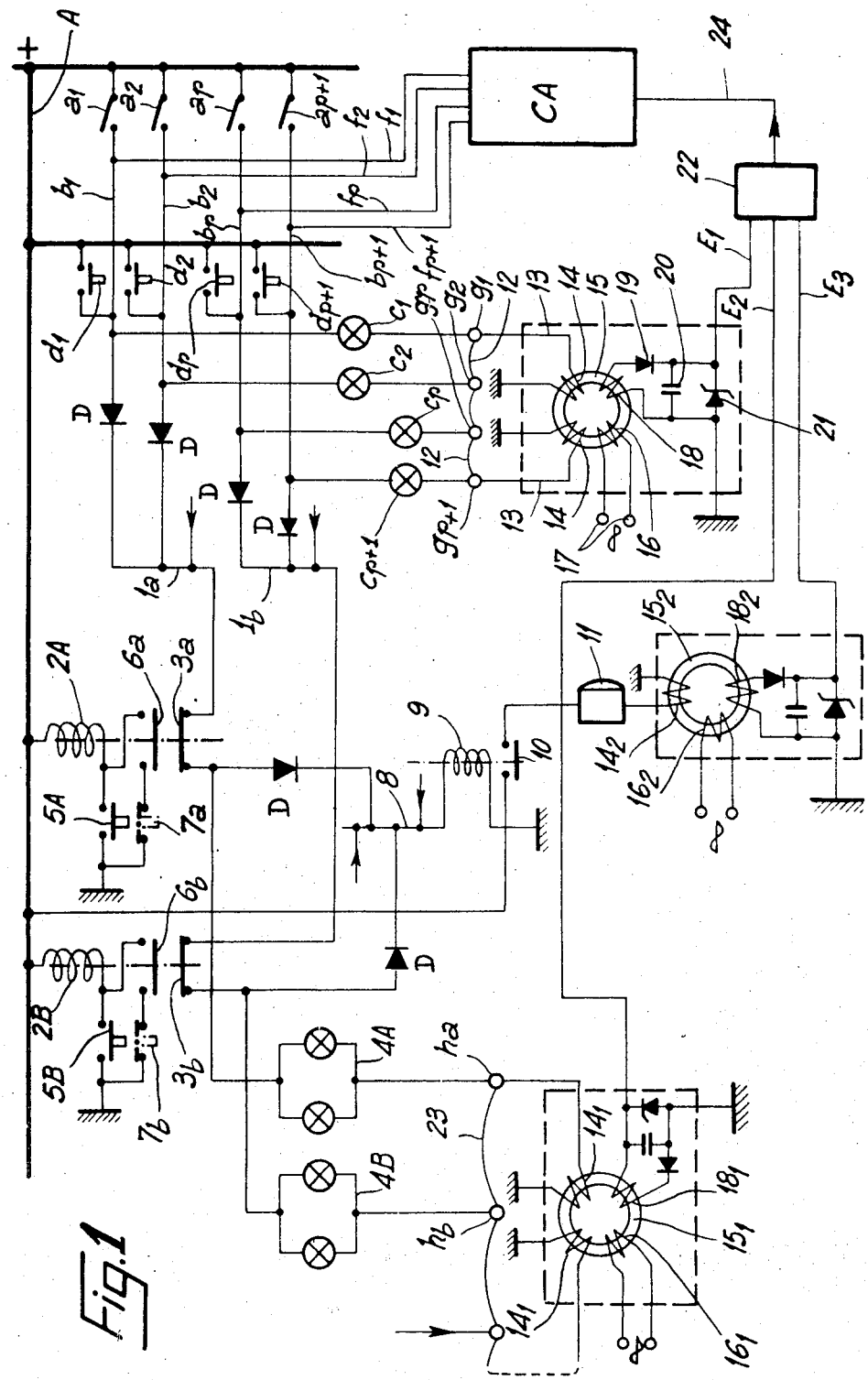

United States Patent
Moline

[15] 3,689,920
[45] Sept. 5, 1972

[54] AUTOMATIC MONITORING SYSTEM FOR ALARM CIRCUITS USED ON BOARD AIRCRAFT

[72] Inventor: Augustin Moline, Toulouse, France

[73] Assignee: Societe Nationale Industrielle Aerospatiale, Paris, France

[22] Filed: March 3, 1971

[21] Appl. No.: 120,640

Related U.S. Application Data

[63] Continuation-in-part of Ser. No. 740,255, June 26, 1968, abandoned.

[30] Foreign Application Priority Data

July 6, 1967    France.....................67113334

[52] U.S. Cl. .......................340/411, 324/51, 340/27, 340/214
[51] Int. Cl. ...............................................G08b 29/00
[58] Field of Search .........340/214, 410, 411; 324/51

[56] References Cited

UNITED STATES PATENTS

| | | |
|---|---|---|
| 2,810,881 | 10/1957 | Daily...........................324/51 |
| 2,982,913 | 5/1961 | Berry........................324/51 X |
| 3,120,758 | 2/1964 | Craddock et al. ......340/411 X |
| 3,354,389 | 11/1967 | Hordosi....................324/51 X |
| 3,430,135 | 2/1969 | Mullen .........................324/51 |
| 3,508,232 | 4/1970 | Williams et al.............340/214 |

*Primary Examiner*—David L. Trafton
*Attorney*—Mauro & Lewis

[57] ABSTRACT

An automatic monitoring system for alarm circuits used on board aircraft including a uniselector which successively energizes the alarm circuits, each comprising a plurality of parallel-connected alarm devices. Owing to detector means associated to each alarm device and one AND - gate collecting signals from the detectors, simultaneous operation of the alarm devices associated with one alarm circuit is checked and the monitoring proceeds.

8 Claims, 2 Drawing Figures

Fig. 2

AUTOMATIC MONITORING SYSTEM FOR ALARM CIRCUITS USED ON BOARD AIRCRAFT

This application comprises a continuation-in-part application to my prior co-pending application Ser. No. 740,255 filed June 26, 1968, originally entitled "Automatic Control System for Alarm Circuit Used on Board Aircraft," non abandoned.

The systems on board an aircraft have many alarm circuits for drawing attention to operational faults. These circuits can operate only if they are in a satisfactory, fault-free condition, so that to enable the satisfactory state of the alarm circuits to be tested, each of them as a rule has a manual contact which produces an artificial fault equivalent to a breakdown, thus enabling the correct operation of the alarm circuit to be tested.

Much time is wasted before every take-off by carrying out these manual operations to a check-list in a particularly defined order.

Moreover, the alarm circuits are complex, because the detection of a fault as a rule includes at least the following: the lighting-up of a lamp precisely identifying the fault, for instance a fall in the fuel level in a particular tank, on a table in sight of the mechanic; the lighting-up of a more general informational lamp which, for example, in the preceding case, shows a fault in the fuel feed on a table in sight of the pilot; the operation of an audible alarm device, for instance a single-stroke gong or bell drawing the crew's attention.

For each circuit a check must be made that the three alarm indicators operate simultaneously, since a pilot lamp, or the gong, for instance, which are fed by a number of alarm circuits may be faultily connected to some of the circuits. Experience has shown that it is difficult for the crew to take note of this simultaneous operation; more particularly, it is difficult to make sure that the gong is working properly every time a lamp lights up.

The invention obviates these disadvantages by allowing the automatic and successive checking of all alarm circuits, and the checking of the simultaneous operation of all the visible and audible warnings associated with the same circuit.

Moreover, the checking of each circuit is performed in a very short time — of the order of 1 second — thus achieving a very considerable saving in time in comparison with the manual checking operation as a rule performed on about a hundred alarm circuits.

The invention relates to an automatic monitoring system for alarm circuits used on board aircraft, in which a uniselector distribution frame whose movement is controlled by an automatic time base successively energizes each of the alarm circuits to be checked, while each of the electric alarm circuits, which are adapted to operate when the circuit is fed, comprises a detector of its feed current adapted to supply a control voltage, the various control voltages, active simultaneously, entering an "AND" gate whose output voltage is applied to an assembly which interrupts the movement of the uniselector if the aforementioned output voltage is absent.

Since the uniselector also has counter circles, one or more of them may be connected to number indicator, so that when the uniselector stops, the defective circuit can be recognized by its order number; this indication can be clearly shown by means of lamps.

Various kinds of current detectors can be used in the circuit of an alarm system, inter alia a resistor can be included in the circuit, and the drop in voltage occuring in the resistor when the current flows therethrough can control, between its base and emitter, the flow of current in a transistor at whose collector a voltage thus appears when the current is actually flowing through the circuit to be checked.

Even more simply, the winding of a relay can be included in the circuit to be monitored whose normally open (NO) contact, connected to a suitable source, would be closed when the current flowed through the circuit.

The first-mentioned method has the disadvantage of introducing members which cannot be uncoupled from the circuits to be monitored and which cause considerable disturbances in the circuits; these members moreover must be protected against overvoltages.

The second-mentioned method causes a considerable drop in voltage in the circuits to be monitored, and if the contact of a NO relay sticks, an error is produced which is difficult to detect.

The current detector is therefore preferably of the magnetic amplifier kind. According to one embodiment of the invention the current detector comprises a high-hysteresis magnetic circuit, on which are wound a winding through which the current to be detected flows, an energizing winding through which an alternating current flows, and a read-out winding connected to a rectifier, the flux induced by the current to be detected saturating the magnetic circuit.

Thus, in the absence of the current to be checked, the assembly operates as a transformer, and a voltage appears at the rectifier terminals. The voltage disappears when the current to be checked is present, since in view of the saturation of the magnetic ring core, any variation in magnetic flux no longer affects the read-out winding.

The only disadvantage of such a magnetic detector is that in the absence of energization by the alternating current, the absence of current to be checked does not appear as a fault since, in this case also, no output voltage is received. This disadvantage can readily be remedied by the permanent visible or audible checking of the presence of the alternating current in the energizing winding.

To reduce the number of current detectors, the outputs of the alarm circuits to be checked, comprising alarm systems of the same impedance, can be interconnected by a single conductor to pass through a single current detector.

If the detector is a magnetically-operating one (magnetic amplifier or relay), both ends of the interconnecting conductor may be connected to the corresponding feed terminal, each via a coil acting on the magnetic circuit of said detector, the two coils being equal and wound in the same direction.

When current flows through one of the alarm, therefore, no matter in what way the current may be distributed in the two coils, the magnetic circuit receives the same flux, and the current detector operates in the same way.

In this way only a small number of detectors need be used, even only one detector per panel of indicating lamps.

The use of the invention will be more clearly understood from the following description, with reference to the accompanying non-limitative exemplary drawings; features to be gathered both from the description and the drawings of course form part of the subject matter of the invention.

Figure 2:
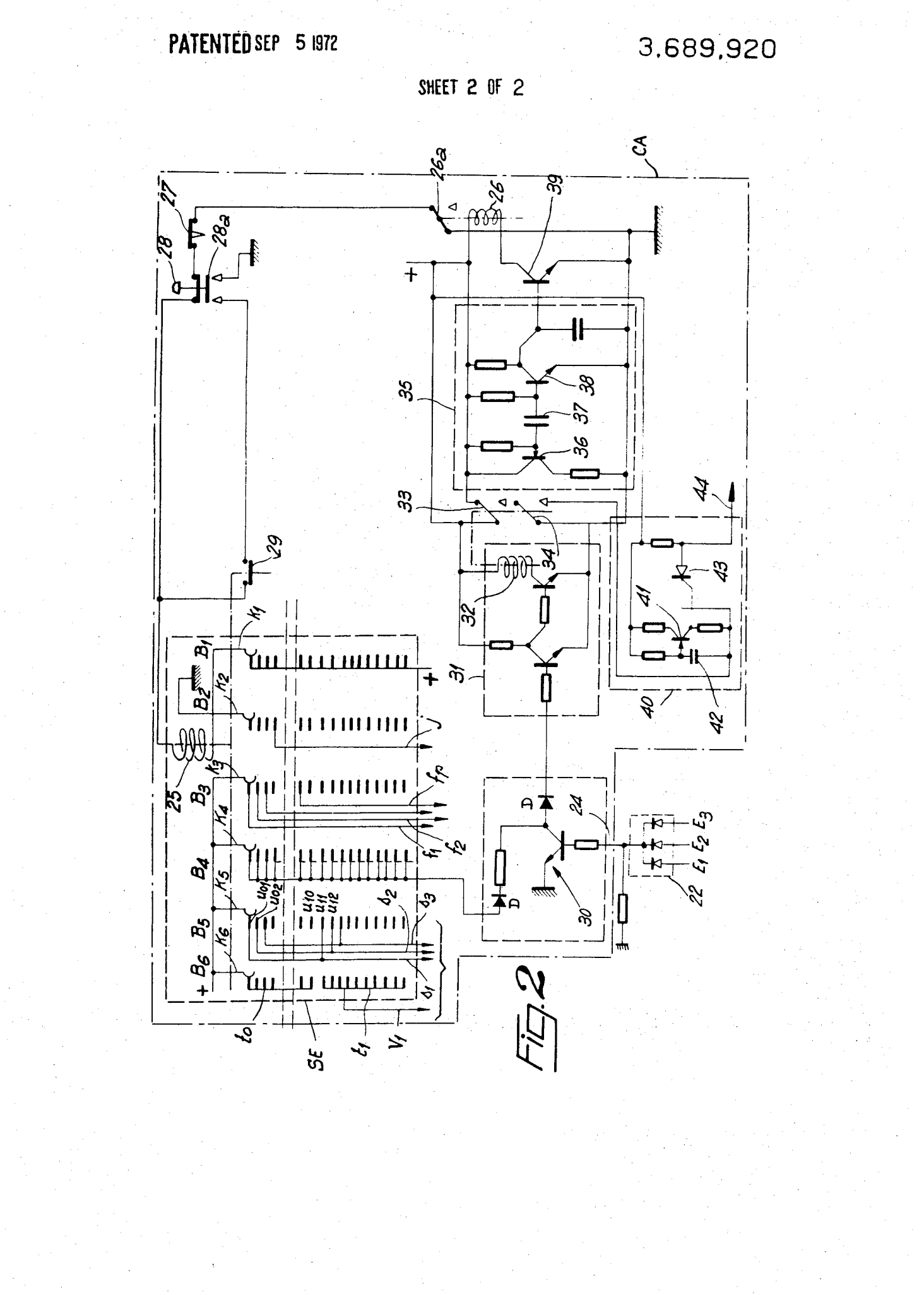

FIG. 1 is an overall diagram showing the system according to the invention for automatically monitoring alarm circuit, and FIG. 2 shows a detail of FIG. 1, i.e. the uniselector and its associated members.

Referring to FIG. 1, contacts $a_1, a_2 \ldots a_p, a_{p+1}$ are closed individually when a breakdown or fault occurs in one of the aircraft systems, for instance, absence of pressure in one of the hydraulic or pneumatic circuits, drop in the level of the tanks, rising or falling of abnormal temperatures, etc.

Each of these contacts thus energizes an alarm circuit $b_1, b_2 \ldots b_p, b_{p+1}$ from the positive terminal A of a voltage source whose other terminal is connected to chassis. The energizing of one of the alarm circuits directly lights up an individual lamp $c_1, c_2 \ldots c_p, c_{p+1}$ directly connected to chassis and disposed in one of the panels of a control table facing the mechanic.

Moreover, the circuits belonging to the same group (fuel feed, hydraulic system, air-conditioning, defrosting, etc) feed via the common conductors $1a, 1b \ldots$ and the normally closed (NC) contacts $3a, 3b \ldots$ a smaller number of lamps 4A, 4B also connected to chassis and grouped on a table in sight of the pilot. For safety reasons these as a rule consist of two lamps (Korry system).

When the captain of the aircraft has been warned and been able to give orders accordingly, he can extinguish the lamp by means of buttons 5A, 5B . . . which energize windings 2A, 2B of relays with which the NC contacts $3a, 3b \ldots$ are associated. The NO contacts $6a, 6b \ldots$ maintain the energization of these relays and drop only when action is taken on the cancelling buttons $7a, 7b \ldots$ The conductors $1a, 1b$ are also connected, beyond the NC contacts $3a, 3b \ldots$ to a common conductor 8 for feeding the coil 9 of a relay whose contact 10 connects, between the feed terminals, a single-stroke bell or gong 11.

On the normal condition, therefore, the closure of one of the contacts $a$ lights up a single lamp $c$ and a double lamp 4 and sounds a bell or gong.

The satisfactory operation of each of the alarm circuits can be checked by artificially putting them individually under positive voltage by means of buttons $d_1, d_2 \ldots d_p, d_{p+1}, \ldots$, i.e. the usual procedure before taking-off.

According to the invention, this successive energization of all the circuits to be tested is performed by a uniselector associated with an automatic monitoring device CA, an embodiment of which is illustrated in FIG. 2. As will be gathered from the detailed description of FIG. 2, each of the feed lines is energized in turn for a very brief time. For electrically separating the alarm circuits they may be provided with serially connected diodes D.

Terminals $g_1, g_2 \ldots g_p, g_{p+1}, \ldots$ for connecting the lamps $c$ to chassis are interconnected by conductors 12, and the two end terminals are connected to chassis by conductors 13 in series with two coils 14 which are equal and wound in the same direction on a high-hysteresis magnetic ring core 15.

Also wound on the ring core 15 is a coil 16 to whose terminals 17 an alternating voltage source is applied of preferably fairly high frequency, for instance 2,000 cycles per second, so as to induce in the ring core 5 magnetic fluxes in alternating directions which are reversed at a relatively high frequency. It is known that various aircraft control systems use alternating sources of 400 and 2,000 cycles per second in frequency, so that the invention does not mean that such a source has to be added to the aircraft.

Lastly, the ring core 15 also bears the read-out coil 18 in series with a rectifier 19 and at the terminals of which a capacitor 20 is mounted.

The rectified voltage set up at the terminals of the capacitor 20 is also determined and stabilized by a Zener diode 21 and applied to the input of the "AND" gate 22.

When current is delivered over one of the lines $f_1, f_2 \ldots$ and the corresponding lamp $c$ lights up, a fraction of this current flows through one of the windings 14 and the rest of the current through the remainder, so that the ring core 15 is saturated. The alternating current feeding the winding 16 therefore induces no current in the winding 18, and a zero voltage is applied to the first input $E_1$ of the "AND" gate 22.

If the corresponding alarm circuit is defective and the current does not flow through the windings 14, the ring core 15 is given an alternating magnetization which induces an alternating current in a winding 18; after rectification, the last-mentioned current produces a positive voltage at the first input $E_1$ of the "AND" gate 22.

Similarly, output terminals $h_a, h_b \ldots$ of the lamps 4A, 4B are interconnected and feed both coils $14_1$ mounted on the ring core $15_1$, which also bears the energizing coil $16_1$ and read-out coil $18_1$, so that, in a similar way as described hereinbefore, the second input $E_2$ of the "AND" gate 22 receives a zero voltage if the circuit of the corresponding lamp 4 is in order, and a positive voltage if the contrary is the case.

Lastly, the output of the bell or gong is connected to a single coil $14_2$ borne by the ring core $15_2$ on which there are also mounted coils $16_2, 18_2$, the latter feeding after rectification the third input $E_3$ of the "AND" gate 22.

When this gate receives three zero voltages, the signal which it delivers to its output 24 enables the operation of the automatic monitoring device CA to be pursued, while if one of the three input voltages is not zero, the result is a signal which stops the automatic controller CA.

This result is achieved by the assembly shown in FIG. 2. The assembly comprises a uniselector of telephone type SE or a plurality of uniselectors mounted in series if the number of circuits to be monitored is greater than the number of possible positions of a single uniselector. Each uniselector comprises circles of contacts, as $B_1 - B_6$. In conventional manner, the displacement of the ganged selector arms $K_1 - K_6$ which describe these circles is ensured by a spring (not shown) stressed by an electromagnet 25 every time the latter is energized, and released for one step progression of the arms when the current is cut off from the electromagnet 25. The latter is fed at each step by the contact circle $B_1$ and the selector arm $K_1$.

The successive cutting-off of the current is as a rule ensured by contact 26a of a relay 26, when the contact moves from the closed position shown into the open position.

By touching the button 27, therefore, the uniselector can be advanced by one step each time. Lastly, by pressing the resetting button 28, the uniselector can be returned to its starting position, since the circuit of the electromagnet 25 is again connected directly to chassis by the contact 28a, while the contact 29 is actuated (like the hammer of an electric bell) by the electromagnet 25, i.e. cut-off automatically on each energization of the electromagnet 25.

The selector circle $B_2$, whose arm $K_2$ is connected to chassis enables, in the case of some alarm circuits, a number of their elements to be connected to chassis via conductors, as J, which are connected to chassis only for certain positions of the uniselector SE.

The circle $B_3$ whose sectors are energized by the arm $K_3$ feeds conductors $f_1, f_2, \ldots f_p \ldots$, which supply positive test voltages to the alarm circuits; the circle $B_4$ also transmits at each step a positive voltage to the collector of n-p-n type transistors 30 whose base is connected to the outputs of each "AND" gate 22.

The collector of the transistor 30 is connected to the input of an amplifying assembly 31 having two n-p-n transistors, the second of which comprises in its output circuit the coil 32 of a relay having two contacts 33,34. For current regulation purposes, the connection between the transistors 30 and the amplifying assembly may comprise a tunnel diode.

The NC contact 33 feeds a time base 35 which mainly comprises a unijunction transistor 36 having a capacitor 37 in its base circuit. The variations in voltage of the capacitor 37 are transmitted to the base of the transistor 38 to unblock the latter; an amplifying transistor 39, whose collector circuit contains the winding 26, controls the contact 26a. In the operative position, the contact 34 feeds the breakdown indicator 40 which comprises a delayed circuit formed by a single junction transistor 41 and a capacitor 42, and a thyristor 43.

The output 44 of the thyristor feeds a visual or audible warning device, or else a source for lighting-up the test counter, which then becomes visible.

The counter comprises a unit indicator formed by the contact circle $B_5$ over which selector arm $K_5$ passes, and a counter by ten formed by the circle $B_6$. The arm $K_5$ successively energizes contacts $u_{01}, u_{02} \ldots u_{09}, u_{10}, u_{11} \ldots$ to feed the conductors of units $s_1, s_2, s_3 \ldots$, while the arm $K_6$ energizes the series of sectors $t_0, t_1$ which correspond to the tens and which are connected in series of tens to conductors, as $v_1$.

The afore-described system operates as follows:

At each position of the uniselector, the circle $B_3$ (and if necessary the circle $B_2$) energizes an alarm circuit to be tested. If the circuit is in a satisfactory state, a zero voltage appears at the base of each transistor 30 whose collector in that case receives a positive voltage from the corresponding contact of the circle $B_4$. The corresponding transistor 30 is therefore conductive, and its circuit is directly connected to chassis.

The contact 33 remaining then closed, the time base 35 operates and, at the end of a time determined by its own time constant, the winding 26 is energized; the contact 26a opens, and the uniselector advances by one step, thus initiating the testing of the next alarm circuit.

If an alarm circuit is out of order, the corresponding transistor 30 does not become conductive, and the positive voltage coming from the uniselector is transmitted to the amplifier 31, which operates the relay 32, 33, 34.

With the opening of the contact 33, the time base ceases to be fed, so that the uniselector is immobilized in its particular position and the closure of the contact 34 feeds the breakdown indicator 40. At the end of the time determined by the capacitor 42 and the unijunction transistor 41, a voltage appears at the output 44, so that the visual and audible alarm becomes operative and the number of the current test appears.

When an alarm circuit has a fault and the system stops, tests can be continued by pressing button 27, which makes the uniselector advance by one step and therefore causes it to move beyond its stoppage place. Also, by pressing button 28, the uniselector can be returned to its starting position, to make indispensable readjustments without further checking.

Alarm circuits which use the alternating current of the aircraft, can be fed with alternating current, in which case the current of these circuits is rectified and filtered before being sent to the current detector.

In a practical embodiment, the system according to the invention can have a board comprising the counter and indicator lamps for the test taking place, an operating switch, and buttons 27, 28. The current detectors can be disposed towards the connections to chassis of the lamps on the breakdown-indicating panels for the mechanic and the pilot, while the "AND" gates are grouped with the other electronic assemblies and the uniselector in a suitable casing.

Clearly, modifications can be made to the embodiments described hereinbefore, inter alia by the substitution of equivalent technical means, without exceeding the scope of the invention.

I claim:

1. Automatic monitoring system for alarm circuits fed by direct current and used on board aircraft, each said circuit having several alarm devices parallel-connected in its output, comprising a uniselector distribution frame having ganged sliders each associated with a circle of consecutive contacts and stepwisely rotatable by a spring-urged electromagnet; a time base with associated relay for stepwise feeding of said electromagnet, a connection between the input of each alarm circuit and one of the consecutive contacts of a first circle of said selector; a current detector associated with each alarm device of said circuit; an "AND" gate, each input of which is connected to the output of one of the current detectors of all the alarm devices fed by the same alarm circuit; relay means controlled by the output of the said "AND" gate for cutting the feeding of said time base owing to a normally-closed contact in opened position of said "AND" gate and at least a second contact circle, the contacts of which are connected to indicator means of the position of said ganged sliders.

2. Automatic monitoring system according to claim 1, wherein said uniselector comprises at least a third contact circle having at least one contact connected to a number of selected alarm circuits.

3. Automatic monitoring system according to claim 1, wherein said uniselector comprises at least a fourth contact circle, each contact of which is connected to said relay means for the feeding thereof.

4. Automatic monitoring system according to claim 1, wherein a current detector comprises around a closed magnetic circuit made of material having a substantially rectangular hysteresis cycle, at least one winding for the direct current to be detected, the magnetic flux generated in said winding by said current saturating said magnetic circuit; an energizing winding for alternating current and a read-out winding serially connected with a rectifier, both latter winding and rectifier being shunted by a capacitor from the terminals of which is pick up the control voltage of an "AND" gate input.

5. Automatic monitoring system according to claim 4, wherein the output of a plurality of alarm devices of the same kind are interconnected by an electric wire, both ends of which are connected to the same pole of the direct current feeding source via two equal windings similarly coiled around the same closed magnetic circuit whereby one of said windings is always fed by a part of the current to be detected and the other by the remainder of said current.

6. Automatic monitoring circuit system according to claim 1, further comprising a manual switch serially connected in the connection between said time base relay and said uniselector for operating said spring-urged electromagnet along one step.

7. Automatic monitoring circuit according to claim 1, further comprising in the uniselector a fifth contact circle and push button means for directly feeding said spring-urged electromagnet via said fifth circle and a contact operated by said electromagnet.

8. Automatic monitoring system according to claim 1, wherein the relay means feeds via a normally-opened contact a delayed breakdown indicator.

* * * * *